(12) United States Patent
Wolf et al.

(10) Patent No.: US 9,751,185 B2
(45) Date of Patent: Sep. 5, 2017

(54) ASSEMBLY HAVING A HANDHELD POWER TOOL AND A ROUGHING DISK

(71) Applicant: RHODIUS SCHLEIFWERKZEUGE GMBH & CO. KG, Burgbrohl (DE)

(72) Inventors: Mike C. Wolf, Osnabrueck (DE); Gerald Lichter, Bornheim (DE)

(73) Assignee: RHODIUS SCHLEIFWERKZEUGE GMBH & CO. KG, Burgbrohl (DE)

(*) Notice: Subject to any disclaimer, the term of this patent is extended or adjusted under 35 U.S.C. 154(b) by 0 days.

(21) Appl. No.: 14/908,545

(22) PCT Filed: Aug. 4, 2014

(86) PCT No.: PCT/EP2014/066742
§ 371 (c)(1),
(2) Date: Jan. 29, 2016

(87) PCT Pub. No.: WO2015/015015
PCT Pub. Date: Feb. 5, 2015

(65) Prior Publication Data
US 2016/0176007 A1    Jun. 23, 2016

(30) Foreign Application Priority Data
Aug. 2, 2013  (DE) .................. 10 2013 108 355

(51) Int. Cl.
*B24B 23/00*  (2006.01)
*B24B 23/02*  (2006.01)
(Continued)

(52) U.S. Cl.
CPC .......... *B24B 23/02* (2013.01); *B23Q 17/0952* (2013.01); *B23Q 17/0961* (2013.01);
(Continued)

(58) Field of Classification Search
CPC ....... B24B 23/02; B24B 23/028; B24B 49/16; B23Q 17/0952; B23Q 17/0961
(Continued)

(56) References Cited

U.S. PATENT DOCUMENTS 4,516,212 A * 5/1985 Nagashima ........ G05B 19/4163
451/142
4,525,958 A * 7/1985 Reissig ................... B24B 9/107
409/148
(Continued)

FOREIGN PATENT DOCUMENTS

DE    10 2004 003 203 A1    8/2005
DE    10 2009 005 217 A1    8/2009
(Continued)

*Primary Examiner* — George Nguyen
(74) *Attorney, Agent, or Firm* — Norman B. Thot

(57) ABSTRACT

An assembly includes a handheld power tool. The handheld power tool comprises a housing, a drive shaft mounted at the housing via a bearing, a drive unit to drive the drive shaft, handles which are fixedly attached to the housing, a fastening device to fasten a roughing disk to the drive shaft, a first sensor to measure a power consumption value or an acceleration sensor to measure positional change information, an evaluating unit to evaluate the power consumption value sensed or the positional change information produced so as to produce an evaluation result, and an outputting device to output the evaluation result.

17 Claims, 4 Drawing Sheets

(51) Int. Cl.
  *B24B 49/16* (2006.01)
  *B23Q 17/09* (2006.01)
(52) U.S. Cl.
  CPC .......... *B24B 23/005* (2013.01); *B24B 23/028* (2013.01); *B24B 49/16* (2013.01)
(58) Field of Classification Search
  USPC .............................................. 451/5, 344–359
  See application file for complete search history.

(56) References Cited

U.S. PATENT DOCUMENTS

| | | | | |
|---|---|---|---|---|
| 4,910,824 A * | 3/1990 | Nagayama | ............ | A47L 11/305 15/340.4 |
| 4,998,205 A * | 3/1991 | Ricard | ............... | G06Q 30/0284 235/30 A |
| 5,005,318 A * | 4/1991 | Shafir | ....................... | B24B 9/10 451/239 |
| 5,070,655 A * | 12/1991 | Aggarwal | ............... | B24B 49/10 451/10 |
| 5,087,319 A * | 2/1992 | Held | .................... | B29C 59/046 156/555 |
| 5,130,625 A * | 7/1992 | Babel | ....................... | B23Q 5/36 318/560 |
| 6,220,949 B1 * | 4/2001 | Hayashi | ................... | B24D 7/18 451/178 |
| 6,381,012 B1 * | 4/2002 | Yancy | ..................... | G02C 7/02 33/200 |
| 6,415,875 B1 * | 7/2002 | Meixner | ................ | B24B 23/028 173/171 |
| 7,104,342 B2 * | 9/2006 | Berg | ....................... | B24B 23/03 173/1 |
| 9,033,767 B2 * | 5/2015 | Schadow | ................ | B24B 23/028 451/359 |
| 2004/0059459 A1 * | 3/2004 | Baran | ................. | B23Q 11/0032 700/174 |
| 2006/0085092 A1 * | 4/2006 | Redecker | ............. | B23Q 1/0009 700/175 |
| 2006/0286910 A1 * | 12/2006 | Voigt | .................... | B24B 55/052 451/359 |
| 2007/0016325 A1 * | 1/2007 | Esterling | ............ | B23Q 17/0961 700/175 |
| 2007/0095149 A1 | 5/2007 | Sieber et al. | | |
| 2008/0004743 A1 * | 1/2008 | Goers | ..................... | B24B 49/02 700/121 |
| 2008/0302549 A1 | 12/2008 | Zeiler et al. | | |
| 2009/0083916 A1 * | 4/2009 | Lampka | ................. | B24B 23/028 15/3.53 |
| 2009/0186556 A1 | 7/2009 | Hermann | | |
| 2012/0007748 A1 | 1/2012 | Forgues et al. | | |
| 2014/0003876 A1 * | 1/2014 | Roehm | ................... | F16D 48/06 408/199 |

FOREIGN PATENT DOCUMENTS

| | | |
|---|---|---|
| DE | 10 2010 007 714 B3 | 6/2011 |
| DE | 20 2009 018 270 U1 | 10/2011 |
| WO | WO 2006/066259 A2 | 6/2006 |
| WO | WO 2010/041059 A2 | 4/2010 |

* cited by examiner

ASSEMBLY HAVING A HANDHELD POWER TOOL AND A ROUGHING DISK

CROSS REFERENCE TO PRIOR APPLICATIONS

This application is a U.S. National Phase application under 35 U.S.C. §371 of International Application No. PCT/EP2014/066742, filed on Aug. 4, 2014 and which claims benefit to German Patent Application No. 10 2013 108 355.2, filed on Aug. 2, 2013. The International Application was published in German on Feb. 5, 2015 as WO 2015/015015 A1 under PCT Article 21(2).

FIELD

The present invention relates to an assembly having a handheld power tool and a roughing disk.

BACKGROUND

Workpieces can be machined with such an assembly. For this, a roughing disk is fastened, in particular clamped, on the power tool, in particular an angle grinder. The roughing disk has a planar machining area, the plane of which extends substantially radially in relation to the axis of rotation of the drive shaft of the power tool. The disk may also become deformed during the machining so that the machining area is no longer exactly planar in some cases. Areas of the workpiece that are aligned substantially parallel to the roughing disk are consequently machined. The roughing disk is usually driven by an electric motor. The operator uses two handles to guide the power tool and carry out the machining of the workpiece. In contrast thereto, a cutting-off disk is used to introduce a cut into a workpiece in an approximately radial direction. The present invention does not relate to assemblies having a cutting-off disk, the present application much rather relates to with "roughing-specific" problems.

Because it is conducted in a handheld manner, the quality and working result of the machining operation is greatly dependent on the experience of the operator and the handling by the operator. It has been found that poor working results are achieved as a result of incorrect operation. Improper handling can, for example, often lead to an excessive amount of roughing disks becoming worn which, through a correct operation, would also have been possible using fewer roughing disks. Incorrect operation may also have the effect that the duration of a working operation is unnecessarily prolonged. Incorrect operation may also have the effect of damaging the surface of the workpiece. Incorrect operation may furthermore have the effect of producing vibrations which are detrimental to the health of the operator. An operator may only be exposed to these vibrations for a certain time, after which the machining must be stopped.

SUMMARY

An aspect of the present invention is to optimize the roughing machining of workpieces with respect to the working result, the time involved, the number of roughing disks to be used, and the personnel requirement.

In an embodiment, the present invention provides an assembly which includes a handheld power tool. The handheld power tool comprises a housing, a drive shaft mounted at the housing via a bearing, a drive unit configured to drive the drive shaft, handles which are fixedly attached to the housing, a fastening device configured to fasten a roughing disk to the drive shaft, a first sensor configured to measure a power consumption value or an acceleration sensor configured to measure positional change information, an evaluating unit configured to evaluate the power consumption value sensed or the positional change information produced so as to produce an evaluation result, and an outputting device configured to output the evaluation result.

BRIEF DESCRIPTION OF THE DRAWINGS

The present invention is described in greater detail below on the basis of embodiments and of the drawings in which.

DETAILED DESCRIPTION

Figure 1:
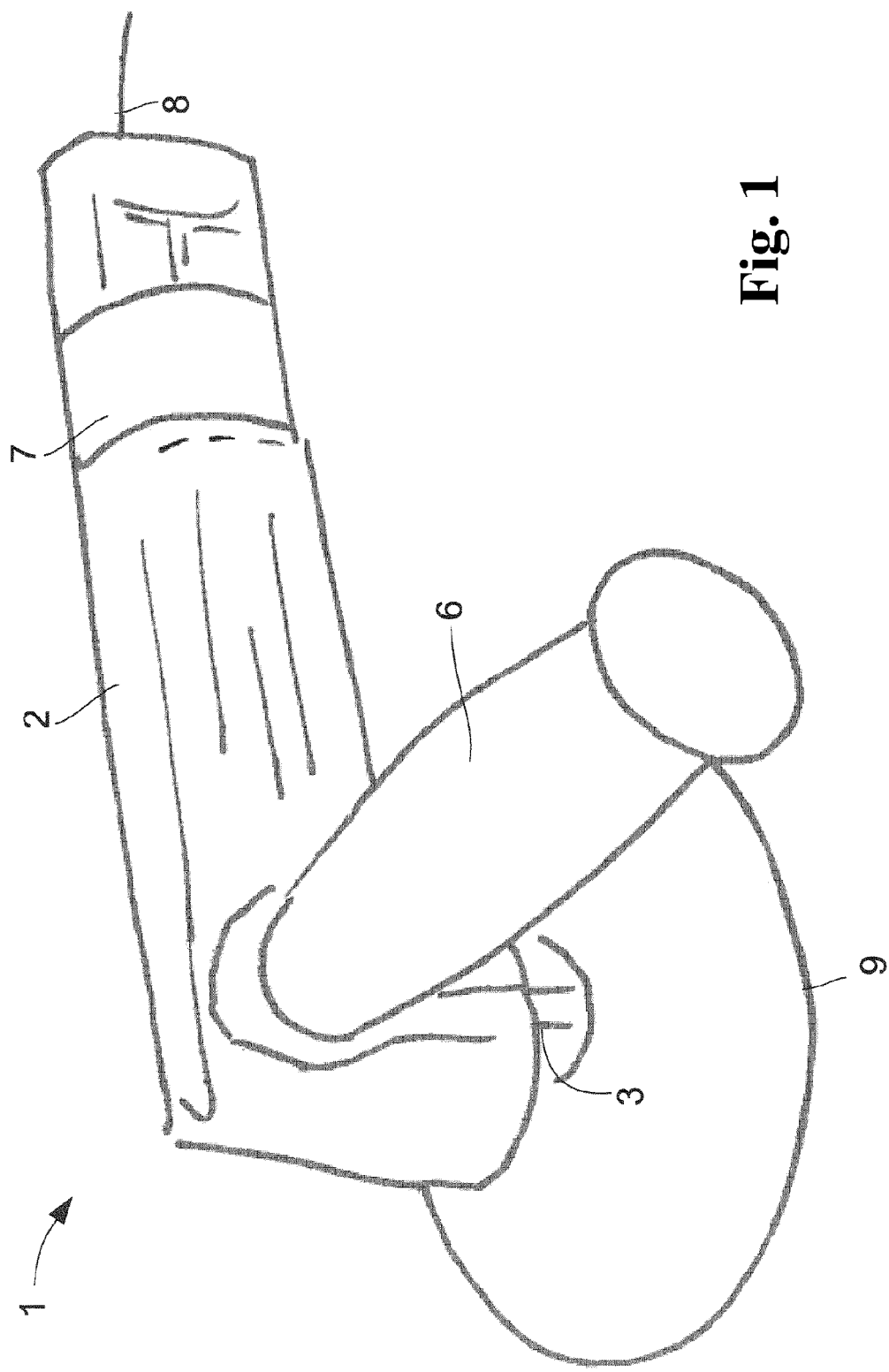
FIG. 1 shows a commercially available power tool with a connected roughing disk.

The assembly having a handheld power tool comprises, along with the roughing disk, a housing, a drive shaft mounted on the housing via a bearing, a drive unit to drive the drive shaft, handles which are respectively fixedly attached to the housing, and a fastening device to fasten the roughing disk to the drive shaft. The assembly also comprises a first sensor to sense a power consumption value, an evaluating device to evaluate the power consumption value sensed, and an outputting device to output an evaluation result of the evaluation by the evaluating device. The term "housing" should be understood broadly and may also comprise internal supporting structures of the power tool. Alternatively or in combination with the first sensor for sensing a power consumption value, the assembly comprises an acceleration sensor for producing positional change information which is evaluated by the evaluating device.

The essence of the present invention is in particular that the work carried out at the handheld power tool with the roughing disk is monitored and is studied, in particular with regard to its efficiency or effectiveness. The power consumed can then in principal be set in relation to a working result, for example, the removal result. Based on the power consumed, it can then be determined whether the working operation is being or has been carried out optimally, and whether a need for change exits. The need for change may then be communicated to the operator via the outputting device. A simple form of the output may be "please press harder" in order, for example, for the pressing force to be increased, or "please change the angle/flatter against the workpiece" as a result of which, for example, the removal rate can be increased or the quality of the surface can be improved.

The acceleration sensor may be used to monitor the movement of the power tool. The quality of the machining during the roughing always requires an oscillating movement of the tool on the surface. Such a sufficient movement may be monitored by the acceleration sensor. In the event of an insufficient oscillating movement, the operator may be made aware of this by a message "please oscillate more".

The acceleration sensor may also be used to monitor unhealthy vibrations. These vibrations are in principle often not caused by the roughing operation per se, but are rather caused by incorrect or suboptimal operation of the power tool by an inexperienced operator. Conventional systems, including tool systems different than the one here concerned, provide monitoring of the unhealthy vibrations simply by using sensors to document the degree of the vibrations to which the operator is exposed. The present invention differs therefrom by the operator being provided with a message about incorrect operation or being guided to an improved way of working by the assembly according to the present invention on the basis of the vibrations determined. Because the operator is not exposed to as many unhealthy vibrations, the operator can perform more roughing work each day. Such a message may be "please place the tool at a steeper angle/flatter angle against the workpiece until the vibrations stop" or "please oscillate more".

The following parameters are therefore important for the quality and efficiency of the roughing machining of workpieces: the force with which the roughing disk is applied to the workpiece; the clearance angle of the disk with respect to the area of the workpiece to be machined; the nature and intensity of the oscillating movement on the basis of which the machining is performed; and, the rotational speed. Characteristic diagrams in which respective optimal parameters are stored may be stored for different roughing disks and the workpieces to be machined therewith. When producing the evaluation result, these stored parameters may be read out and compared with the actual state that is sensed by the sensors. The intent is that the operator is thereby guided as close as possible to the optimum values of the characteristic diagrams on the basis of the evaluation results that are output, which makes it possible to obtain the desired optimization in accordance with the task. The rotational speed of the tools may be controlled automatically in accordance with the stored parameter.

The power consumption value may comprise any values or combination of values that make it possible to draw conclusions on the current energy consumption caused by the roughing grinding operation, for example, based on the strength of a current if the tool is electrically driven. The tool may, however, also be pneumatically or hydraulically driven. It is then possible for corresponding values of the energy-supplying fluid to be used as the power consumption value. The evaluating device evaluates the power consumption value sensed and passes on the evaluation result to the outputting device, in particular to a screen, which outputs the evaluation result.

The acceleration sensor, as a component part of the assembly, may be formed separately from the power tool. The acceleration sensor may, for example, be attached to the arm (including the hand) of the operator, for example, to an armband similar to a fitness armband. The acceleration sensor may be connected to the evaluating unit via a wireless connection. The evaluating unit may alternatively be integrated in the armband or some other unit that is attached to the operator. A simple way of realizing the concept according to the present invention comprises a specially programmed fitness armband with an acceleration sensor that is used to monitor the movement during a roughing operation. According to the present invention, such an assembly even makes it possible to use conventional power tools without any conversion of the tool being required.

In an embodiment of the present invention, a second sensor device can, for example, be provided which senses mechanical loading values that act on a bearing of the drive shaft. The evaluating device then evaluates the mechanical loading values sensed together with the power consumption values sensed. This embodiment is based on the idea that in particular the combination of the mechanical loading values provides important information on the kind of processing. As explained below in greater detail in the exemplary embodiment, it is possible to determine the alignment of the workpiece with respect to the power tool from the mechanical loading values. Since a correct alignment is a basic prerequisite for a qualitatively high-grade and efficient machining of a workpiece, this sensed information can then be used to guide, and if need be, correct, the operator specifically for the machining. Alternatively or in combination therewith, the mechanical loading values may then also be processed together with the power consumption values for statistical purposes. These statistical purposes may be used for invoicing purposes and to support long-term quality studies.

It is not here absolutely necessary that individual elements of the assembly be attached to the power tool. Although it can be advantageous if some of the sensors (or parts thereof) are attached to the tool, the evaluating device and the outputting device in particular need not be attached to the tool itself, but may also be attached to a remotely arranged data processing assembly, which is then in particular a component part of the assembly. This data processing assembly may be connected to the power tool, at least for a time, via a data connection, for example, via a short-distance data connection (Bluetooth, WLAN, cable-bound etc.), or else also by way of a long-distance connection, such as the Internet or a telephone connection.

It can be advantageous if the power tool includes the acceleration sensor. This senses accelerations to which the housing is in particular exposed and converts the accelerations sensed into positional change information. Such positional change information may be of a high-frequency kind which are indicative of vibrations at the tool. If, for example, the operator chooses an alignment of the tool in relation to the workpiece that is not optimal or which produces a pressing pressure that is not correct, the power tool may begin to shake on the workpiece. This could then be stopped, for example, by changing the alignment or changing the pressing pressure. Relevant items of corrective information may then be communicated to the operator by way of the outputting device. An abrupt acceleration of the power tool in a lateral direction may also indicate that the tool is veering away sidewards, which may be caused by an excessively steep clearance angle. If this is also followed by a sudden drop in the power consumed, the lateral veering away is confirmed since the lateral veering away is immediately followed by the power tool losing contact with the workpiece, and therefore there no longer being any frictional resistance.

It can be advantageous if the implementation of the proposed corrective information is checked via the acceleration sensor. For example, the operator may be called upon by the corrective information to hold the power tool somewhat flatter against the workpiece, which necessitates an angular movement. On the basis of the acceleration sensor and the positional change information obtained therefrom, it can be checked whether this change in angle has actually been carried out. If so, a kind of confirmation signal may be output. If not, a renewed message or continued message draws attention to the change in angle to be carried out and/or by the corrective information again being output or continuing to be output.

In an embodiment of the present invention, the mounted roughing disk can, for example, be detected by a sensor of the power tool or the assembly. An operating mode of the power tool is selected or set on the basis of the type of roughing disk detected. Alternatively, an operating mode chosen by the user may also be checked. The sensor device may be an optical sensor which can detect a barcode attached to the roughing disk. Other methods of detection may, however, also be used. If the mounted disk is suitable for machining steel, the tool may be automatically operated at a correspondingly high rotational speed. It may alternatively be checked whether the rotational speed input by the user is suitable at all for machining steel with this disk, and if need be, to output an error message.

In an embodiment of the present invention, parameters relating to individual roughing disks can, for example, be stored in the assembly, in particular in the form of one or more characteristic diagrams. Such parameters may in particular comprise the optimum rotational speed, the optimum clearance angle, the suitability of the disk for a specific material and/or the maximum lifetime of a roughing disk. The parameters may, for example, be updated, in particular on the basis of a connection setup via a remote data connection (for example, the Internet) to a central computer unit. A characteristic diagram on the basis of which the evaluation is performed may also be selected or read in by the operator. The operator can use input when fastening a new disk on the power tool to inform the assembly thereof, for example, via the manual input of a type number of the disk.

The present invention is explained below in greater detail on the basis of the drawings.

FIG. 1 shows a known power tool 1 in the form of an angle grinder 1. The angle grinder 1 comprises a housing 2 with handles 6, 7, at which an operator can guide the power tool with both hands during a working operation. The power tool 1 also has a drive shaft 3, which is mounted in the housing 2. Fastened to the drive shaft 3 is a roughing disk 9. The power tool 1 receives electrical energy by way of a power line 8. Such a power tool 1 may, however, also be driven by other energy sources, for example, pneumatically or hydraulically.

Figure 2:
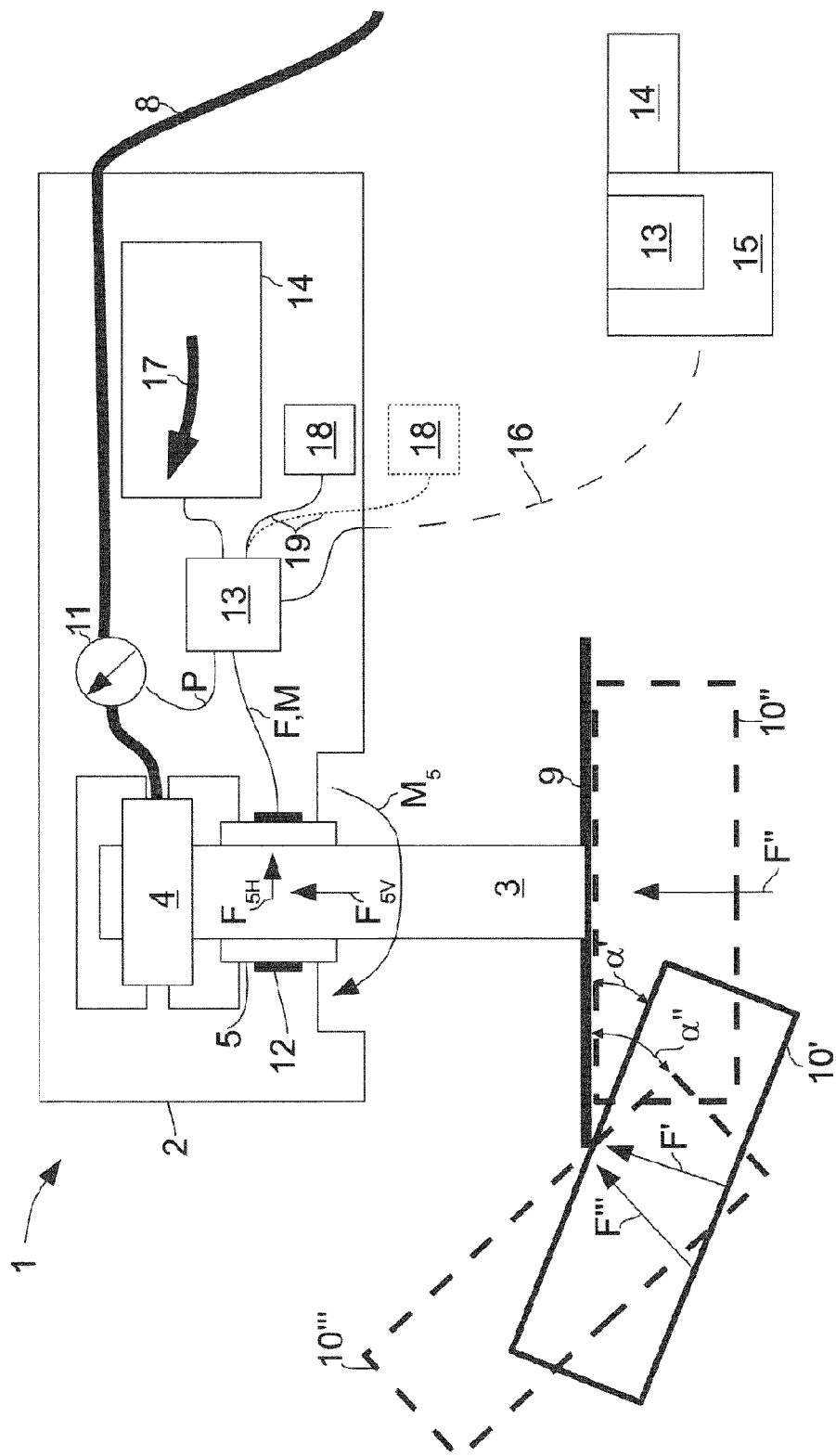
FIG. 2 schematically shows the setup of an assembly according to the present invention having a power tool.

FIG. 2 shows the schematic setup of an assembly according to the present invention having a power tool 1. The power tool 1 used is based largely on the known angle grinder 1 as shown in FIG. 1. Shown in the housing 2 is a bearing 5 for bearing the drive shaft 3. Arranged on the bearing 5 are force sensors 12 which can sense mechanical loading values in the form of forces $F_S$ and moments $M_S$, which act on the bearing 5. The force sensor 12 may in particular sense the vertical force component $F_{SV}$ occurring on the bearing 5 as a result of the machining, the horizontal force component $F_{SH}$ and also the bending moment $M_S$ occurring. The loading values F, M sensed are passed on to an evaluating unit 13.

A drive motor 4, which is supplied with electrical energy by way of the power line 8, is also shown. A current measuring device 11 determines the strength of the current consumed during operation, from which the power P consumed can be determined. The power P sensed during operation is likewise transmitted to the evaluating unit 13.

Also fixedly attached to the housing 2 is an acceleration sensor 18 which can sense any changes in the position of the housing 2 and can transmit resultant positional change information 19 to the evaluating unit 13. Positional change information 19 is understood as meaning not only changes in the absolute position, but also changes in the alignment, i.e., lateral and rotational accelerations.

A small screen 14 is also provided on the evaluating unit 13. This screen 14 can output corrective information which is intended for the operator. Such corrective information is embodied, by way of example, by a simple arrow 17. The output may alternatively or additionally take place acoustically.

It is not absolutely necessary that the screen 14 be attached to the power tool 1 itself. The evaluation also does need not necessarily take place in the power tool 1. For example, it may be provided that the power tool 1 be connected by way of a data connection 16 to a separate, in particular stationary, data processing unit 15. The evaluating unit 13 or an additional evaluating unit 13 may also be provided on this data processing unit 15. A screen 14 or some other outputting device 14 may be provided on the data processing unit 15 in order to output evaluation results there. The data processing unit may be a PC or notebook.

The roughing disk 9 is fixedly connected to the drive shaft 3 via a conventional fastening device (not shown in the drawings) and is suitable for removing material from the workpiece 10 in a machining manner. By way of example, a workpiece 10 is shown in three different positions in relation to the roughing disk 9 or in relation to the power tool 1. The workpiece 10 is marked in a first position by the designation 10' and is depicted by a solid line. The roughing disk 9 is here in angular contact with the workpiece 10 at a clearance angle α of approximately 30°. It can be seen that, as a result, a supporting force F' acts between the workpiece 10' and the roughing disk 9 and produces the force components $F_{SH}$, $F_{SV}$ acting on the bearing 5 both in the horizontal direction (parallel to the roughing disk 9/perpendicularly to the drive shaft 3) and in the vertical direction (perpendicularly to the roughing disk 9/parallel to the drive shaft 3), and also a bending moment M', which can be absorbed by the bearing 5. The workpieces 10" and 10'" represented by dashed lines represent alternative relative alignments of the roughing disk 9 with respect to the workpiece 10. The designation 10" marks the workpiece 10 in an alignment in which the area to be machined of the workpiece 10 is aligned parallel to the roughing disk 9 or perpendicularly to the drive shaft 3. The designation 10'" marks the workpiece 10 in an alignment in which the area to be machined of the workpiece 10 is aligned at a clearance angle of approximately 60° or more in relation to the roughing disk 9. The forces F" and F'" then respectively correspond to the pressing forces in the respective states.

Figure 3:
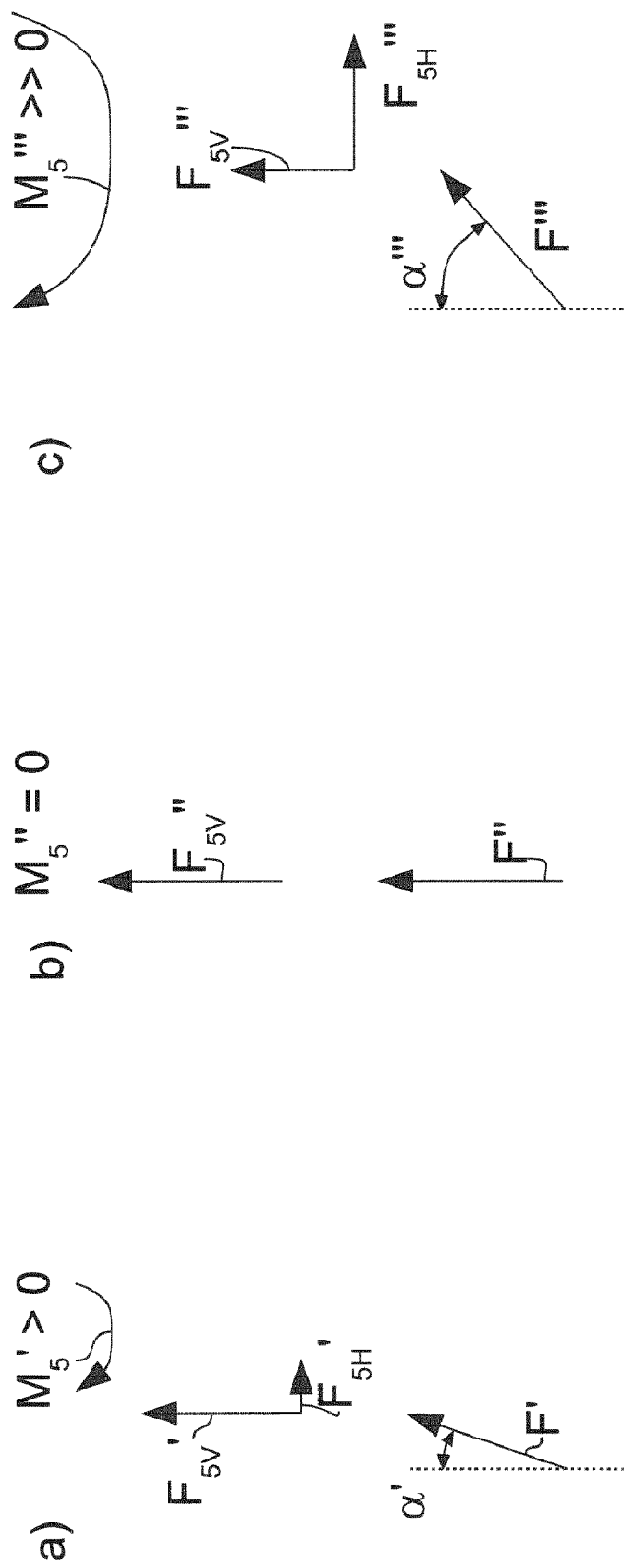
FIG. 3 shows the mechanical loads on the tool during different alignments.

FIG. 3 shows how the alignment of the roughing disk 9 with respect to the workpiece 10 can be inferred from the mechanical loading values. FIG. 3 a) shows at the bottom the force F' that is present between the workpiece 10' and the roughing disk 9. Represented above the force F' are the resultant force components $F_{SV}{}'$ and $F_{SH}{}'$ acting on the bearing 5 and also the resultant bearing moment $M_S{}'$. The clearance angle α can be inferred from the ratio of the resultant force components $F_{SV}{}'$ and $F_{SH}{}'$.

In FIG. 3 b), the resultant bearing loads $F_{SV}{}''$ and $F_{SH}{}''$ and $M_S{}''$ are shown for the case where the roughing disk 9 is aligned parallel to the area to be machined of the workpiece 10. There is no horizontal force component $F_{SH}$ and also no bending moment M on the bearing 5 since the clearance angle α is equal to zero. It is evident that in this way there is optimum contact between the roughing disk 9 and the workpiece 10. The machining of individual points here takes quite a long time, however, since the surface pressure at individual points of the workpiece 10 is quite low as a result of the large contact area. The parallel alignment in particular is suitable for removing material over a large area, but not for machining small areas that are much smaller than the total area of the roughing disk 9.

FIG. 3 c) shows the force components $F_{5V}'''$ and $F_{5H}'''$ on the bearing 5 and also the bending moment $M_5'''$ on the bearing 5 for the case where the roughing disk 9 is held at a clearance angle α of 60° or more with respect to the workpiece 10. It can be seen that the horizontal force component $F_{5H}'''$ on the bearing 5 is once more increased significantly in comparison with the situation according to FIG. 3 a). The bearing moment $M_5'''$ also increases significantly. The vertical component $F_{5V}'''$ is, however, reduced. As a result of the great ratio between the horizontal force and the vertical force, the quite steep clearance angle can be inferred. A qualitatively high-grade, surface-area machining cannot be carried out with such a steep clearance angle.

By jointly considering the power P consumed together with the mechanical load F, M, it can thus be determined that the operation of the handheld power tool 1, for example, in the case of the alignment according to the workpiece 10''', is not optimal. The evaluating unit 13 then calculates that the power tool 1 should be slightly displaced to the left and turned clockwise in order to achieve an improved alignment between the workpiece 10 and the power tool 1. This is indicated to the operator, for example, by the arrow 17 represented on the screen 14 as corrective information 17. The optimized alignment between the power tool 1 and the workpiece 10 is then visually indicated by the workpiece 10 provided with the designation 10' and represented by solid lines. The force F' then acts approximately at an angle to the drive shaft 3. Only substantially small horizontal force components $F_H$ or small bending moments M arise. The supporting force that the operator must then apply thus acts significantly "more perpendicularly" on the workpiece 10, whereby the machining is more effective.

Whether the operator has correctly implemented the corrective information 17 can be checked, for example, on the basis of the acceleration sensor 18. The acceleration sensor 18 outputs information 19 concerning changes in position and changes in alignment of the housing. On the basis of this positional change information 19, it can be checked whether the housing 2 has actually been displaced in accordance with the corrective information 17. If so, the output of the corrective information 17 may be stopped. If not, the corrective information 17 (if required, in amended form) may continue to be outputted. Alternatively or in combination, unsuitable movements of the operator, for example, periodic tilting movements which reduce the efficiency of a working step, can also be determined on the basis of the acceleration sensor 18. An evaluation result may then be constituted by a request to the operator to stop the tilting movements. Vibrations of the housing 2 can also be detected and stopped if need be by minor amendments of the rotational speed.

An excessively steep clearance angle between the roughing disk 9 and the workpiece 10 may also be determined by the acceleration sensor 18 alone or in combination with the mechanical loading values. This can be illustrated by the relative alignment and is represented by the workpiece 10'''. It can be seen that it is less the radially aligned grinding area, but rather more the peripheral circumferential area of the roughing disk 9, that lies against the workpiece 10'''. Instead of grinding, a kind of rolling may occur with such an alignment. As a result, the entire power tool 1 may be accelerated away laterally, similar to a vehicle that is accelerated by a driven wheel. This would bring about a movement of the power tool 1 into or out of the plane of the image of FIG. 2, depending on the direction of rotation. Such rolling is of course undesired and should be stopped as far as possible since this is conducive to the formation of drag lines and generally makes machining by grinding impossible.

An acceleration sensor 18 may alternatively or in combination also be arranged separately from the housing 2, in particular attached to an arm of the operator (for example, to an armband 20). It can then be determined via the acceleration sensor 18 whether the operator is guiding the power tool 1 with a sufficient oscillating movement. The evaluating unit 13 and outputting device 14 may also be arranged on such an armband 20.

The arrangement of the acceleration sensor 18 on the housing 2 of the power tool 1 has the advantage that changes in the absolute position of the machine can be sensed exactly. Relative changes in position with respect to the workpiece 10 can be derived from these changes in position.

The arrangement of the acceleration sensor 18 on the arm of the operator has the advantage that the movements (including the vibrations) that actually occur on the arm can be sensed exactly. However, these movements are only informative to a certain extent with regard to a relative change in the position of the power tool 1 with respect to the workpiece 10.

A statistical compilation concerning the working operation, if need be together with an efficiency evaluation, may also serve as the evaluation result. Such a compilation comprises the power consumption over the duration of a working operation, if need be together with the loading values recorded and the positional change information. Valuable findings for work planning can be generated therefrom. For example, the recorded values of individual operators may thus be compared with one another. Deficient individual operators can be detected and stopped by suitable training measures. A constant power consumption may consequently mean uniform machining, which may also be a measure of the quality of a machining operation. Evaluation results may also be used for invoicing purposes.

Figure 4:
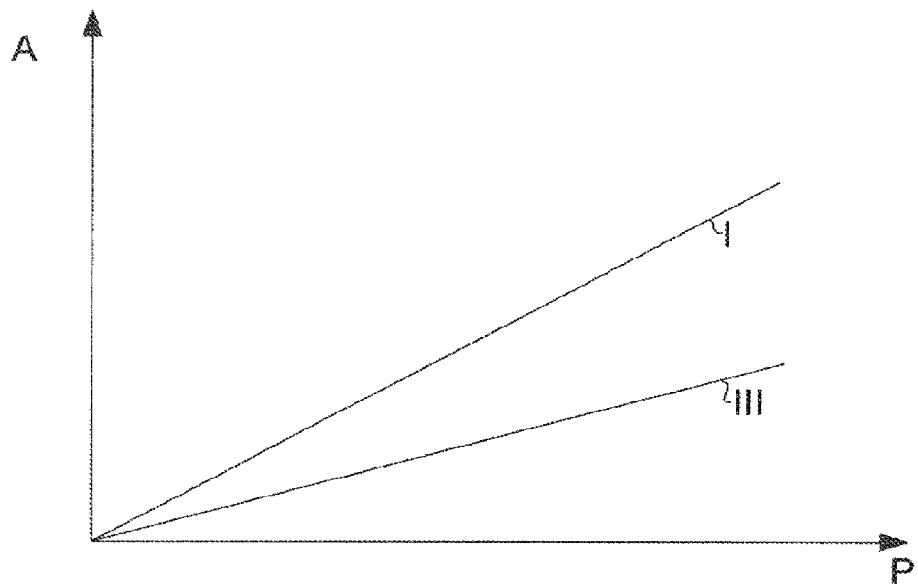
FIG. 4 shows a diagram of working values during the operation of the assembly according to the present invention.

FIG. 4 illustrates the connection between the removal rate A and the power P consumed with a constant pressing pressure and alignment between the workpiece 10 and the roughing disk 9 remaining the same, in the two possible cases I and III, which correspond to the relative alignments of the workpiece 10 in relation to the roughing disk 9 in accordance with the designations 1' and 10''', respectively. The removal rate A here means, for example, the amount of material removed per unit of time, for example, 100 g/min. In the case of a workpiece 10 with a cross section that remains the same, this removal rate A may in turn be linear in relation to an advancing speed.

A linear relationship between the removal rate A and the power P can initially be well seen. The higher the power P consumed, the higher the removal rate A, with the same relative alignment in each case.

The line I represents the values in the case of the relative alignment between the power tool 1 and the workpiece 10 as visually presented in FIG. 2 on the basis of the workpiece 10 marked by the designation 10'. The line III represents the values in the case of the relative alignment between the power tool 1 and the workpiece 10 as visually presented in FIG. 2 on the basis of the workpiece 10 marked by the designation 10''', which is regarded as less efficient.

It is evident that an increased removal rate A is achieved in case I with a smaller power P consumed than in case III. The bending moment in case I as shown in FIG. 3 a) is also much smaller than case III as shown in FIG. 3 c). It is therefore easier for the operator to hold the power tool 1 in the relative alignment corresponding to the workpiece 10' than corresponding to the workpiece 10''', which indirectly has a positive influence on the working result.

The optimum alignment (clearance angle) may in principle be determined on the basis of characteristic diagrams that are stored in the assembly. Such characteristic diagrams may contain optimum relationships between the clearance angle, the power consumed and the pressing pressure and also the oscillating movement of the power tool 1. Such characteristic diagrams may be determined experimentally.

Figure 5:
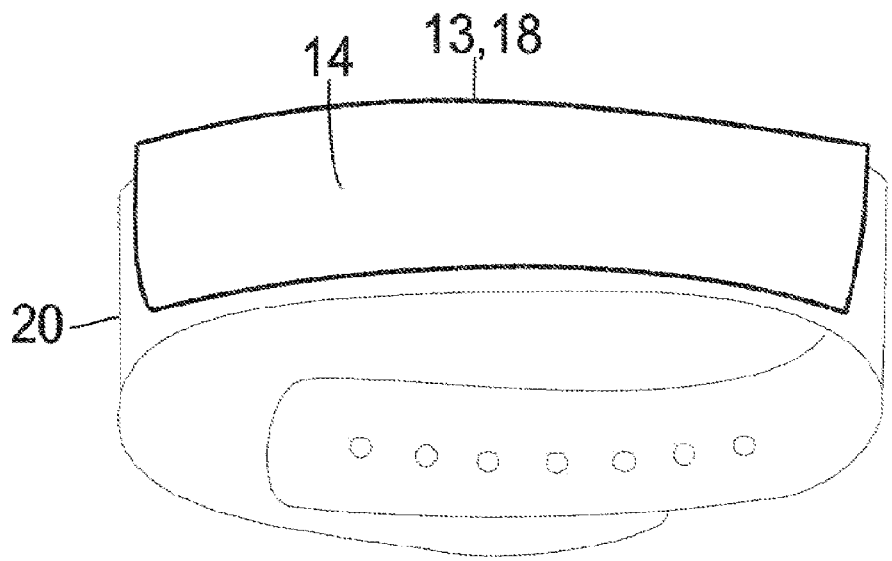
FIG. 5 shows an armband which may be used within the scope of the present invention.

FIG. 5 shows an armband 20 which may be used within the scope of the present invention. It comprises a screen 14 in which the acceleration sensor 18 and the evaluating unit 13 are integrated. An optional data connection to the power tool 1 is established wirelessly.

The present invention is not limited to embodiments described herein; reference should be had to the appended claims.

LIST OF REFERENCE NUMERALS 1 power tool/angle grinder
2 housing
3 drive shaft/drive motor
4 drive unit
5 bearing
6 first handle
7 second handle
8 power line
9 roughing disk
10 workpiece
11 current measuring device
12 force sensor
13 evaluating unit
14 outputting device/screen
15 data processing unit
16 data connection
17 directional indicator on screen/corrective information
18 acceleration sensor
19 positional change information
20 armband
F force component
$F_{5V}$ vertical force component
$F_{5H}$ vertical force component
M moment
$M_5$ bending movement
P power
α clearance angle

What is claimed is:

1. An assembly comprising:
   a handheld power tool comprising:
      a housing,
      a drive shaft mounted at the housing via a bearing,
      a drive unit configured to drive the drive shaft,
      handles which are fixedly attached to the housing, and
      a fastening device configured to fasten a roughing disk to the drive shaft;
   a first sensor configured to measure a power consumption value or an acceleration sensor configured to measure positional change information;
   an evaluating unit configured to evaluate the power consumption value sensed or the positional change information produced so as to produce an evaluation result; and
   an outputting device configured to output the evaluation result.

2. The assembly as recited in claim 1, further comprising:
   a second sensor configured to measure mechanical loading values which act on the bearing of the drive shaft;
   wherein,
   the evaluating unit is further configured to evaluate the mechanical loading values measured.

3. The assembly as recited in claim 1, further comprising a display attached to the handheld power tool.

4. The assembly as recited in claim 1, wherein the assembly further comprises:
   a data processing assembly arranged remote from the handheld power tool; and
   a data connection,
   wherein, the data processing assembly is connected to the handheld power tool at least temporarily via the data connection.

5. The assembly as recited in claim 4, wherein the outputting device is arranged on the data processing assembly.

6. The assembly as recited in claim 5, wherein the acceleration sensor is attached to the housing.

7. A method for operating the assembly as recited in claim 6, the method comprising:
   measuring the power consumption value with the first sensor;
   evaluating the power consumption value with the evaluation unit so as to obtain the evaluation result; and
   outputting the evaluation result via the outputting device.

8. The method as recited in claim 7, further comprising:
   measuring the mechanical loading values acting on the bearing of the drive shaft with the second sensor; and
   factoring in the mechanical loading values with the evaluating unit when producing the evaluation result.

9. The method as recited in claim 8, further comprising:
   measuring positional change information with the acceleration sensor; and
   evaluating the positional change information with the evaluating unit when producing the evaluation result.

10. The method as recited in claim 9, wherein the evaluation result further comprises corrective information for an operator,
    the method further comprising,
    using the corrective information by the operator to correct an alignment of the handheld power tool.

11. The method as recited in claim 10, further comprising checking the correction of the alignment based on the positional change information of the acceleration sensor.

12. The method as recited in claim 9, wherein the evaluation result further comprises efficiency information on a work process.

13. The method as recited in claim 7, wherein,
    the handheld power tool further comprises a mounted roughing disk; and
    a third sensor is arranged either in the handheld power tool or in the assembly, the third sensor being configured to detect a type of the mounted roughing disk,
    the method further comprising:
    detecting the mounted roughing disk with the third sensor, and at least one of,
    selecting an operating mode of the handheld power tool based on the type of roughing disk detected by the third sensor,
    setting an operating mode of the handheld power tool based on the type of roughing disk detected by the third sensor, and reviewing an operating mode of the handheld power tool chosen by the operator.

14. The method as recited in claim 13, wherein, the assembly further comprises a data memory, the data memory being configured to store roughing disk parameters relating to individual roughing disks, the method further comprising, using the roughing disk parameters stored in the data memory of the assembly during the evaluating.

15. The method as recited in claim 14, further comprising updating the roughing disk parameters stored in the data memory of the assembly.

16. A method of using an acceleration sensor to monitor vibrations and/or oscillating movements when using the handheld power tool as recited in claim 1, the method comprising:

providing the assembly comprising the handheld power tool as recited in claim 1;

providing an acceleration sensor configured to produce positional change information fastened to an arm of the operator and/or arranged in the assembly of the handheld power tool;

using the acceleration sensor to monitor the vibrations and/or the oscillating movements when using the handheld power tool with the roughing disk during a rough machining of a workpiece; and communicating corrective information for an improved machining to an operator via the outputting device based on the positional change information produced by the acceleration sensor.

17. The method of using as recited in claim 16, wherein the acceleration sensor fastened to the arm of the operator is integrated into an armband.

* * * * *